July 13, 1965  D. C. KURKJIAN  3,194,520
KITE
Filed Oct. 5, 1962  2 Sheets-Sheet 1
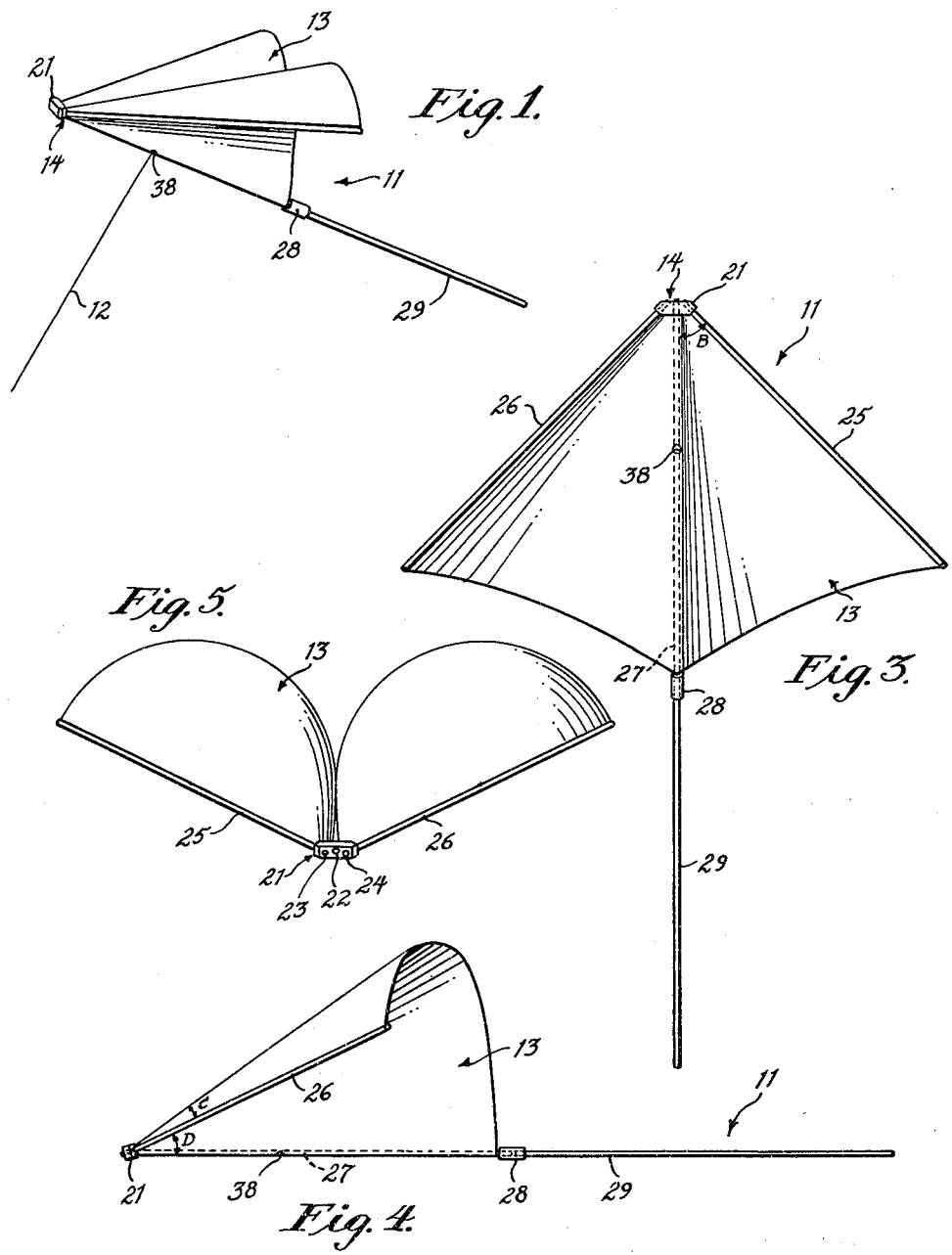
INVENTOR.
DANIEL C. KURKJIAN
BY
Charles A. McChure
ATTORNEY.

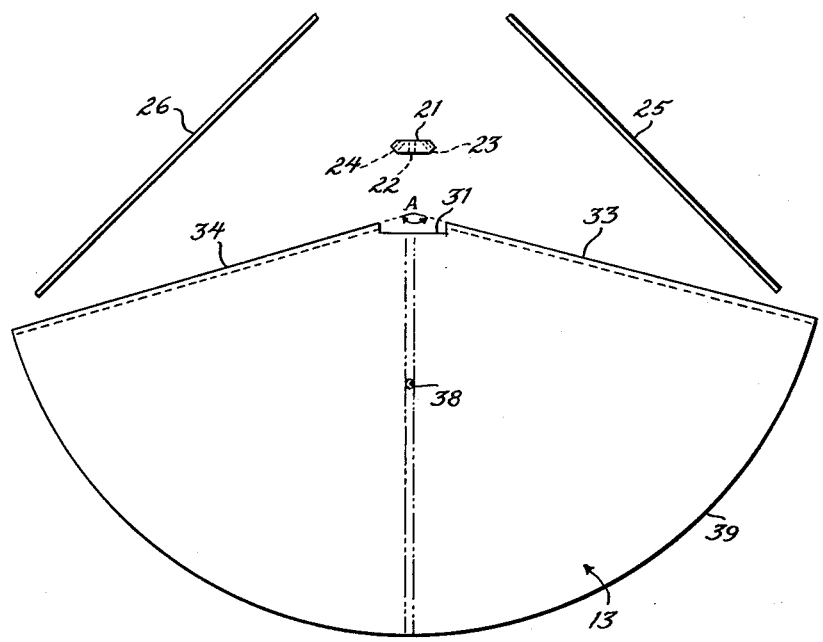
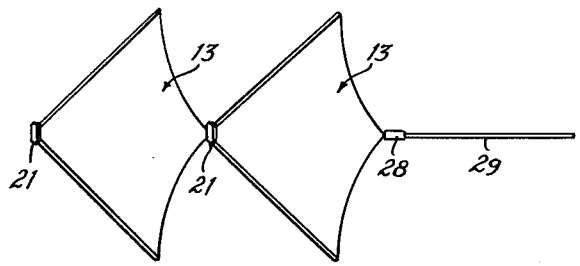
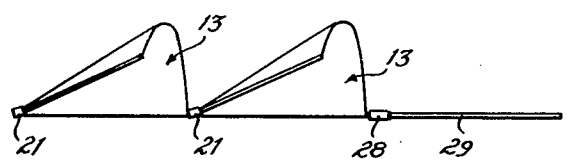

3,194,520
KITE
Daniel C. Kurkjian, R.D. 1, Malvern, Pa.
Filed Oct. 5, 1962, Ser. No. 228,601
9 Claims. (Cl. 244—153)

This invention relates to winged aircraft and may be embodied in a free-flying craft, powered or unpowered, or in a tethered craft or kite.

A primary object of the present invention is improved stability of such aircraft over a wide range of air speeds.

Another object is provision of a basic structural unit therefor, two or more of which may be combined in tandem or in-line arrangement.

A further object is ready assembly and disassembly thereof in the interest of portability and storage convenience.

Other objects of this invention, together with means and methods for attaining the various objects, will be apparent from the following description and the accompanying drawings.

FIG. 1 is a perspective view of an embodiment of the present invention in a kite, represented in flight;

FIG. 2 is an exploded plan view of the kite apparatus shown assembled in FIG. 1;

FIG. 3 is an assembled plan view of the apparatus shown assembled in FIG. 1;

FIG. 4 is a side elevation thereof corresponding to the plan view of FIG. 3;

FIG. 5 is a rear elevation of the same apparatus;

FIG. 6 is a plan view of another embodiment of the invention; and

FIG. 7 is a side elevation of the apparatus shown in plan in FIG. 6.

In general, the objects of the present invention are accomplished, in a winged aircraft, by means of a frame having a central member extending fore and aft and having a pair of side members extending laterally, rearwardly, and upwardly from the central member, the forward edge of the wing being supported by the side members, and the medial portion of the wing being supported by the central member, the wing billowing upward between the central member and each of the side members. The invention comprehends particularly a flexible wing of membranous material having an outline approaching semicircular when flat, the curved edge thereof comprising the trailing edge of the wing.

FIG. 1 shows, in isometric perspective, aircraft 11 of this invention shown in flight as a kite on lead or tether 12. The components of wing 13 and frame 14 are shown in greater detail in subsequent views.

FIG. 2 shows, in plan, the components of an aircraft like that of the preceding view disassembled or "exploded." Nosepiece 21 has central bore 22 (indicated in broken lines) extending fore and aft therethrough flanked by right and left bores 23 and 24 therethrough, which angle outwardly to the rear. Right and left frame members 25 and 26, which have a straight rodlike or tubular configuration, are located at the sides at angles corresponding (as seen in plan) to those of the side bores in the nosepiece. To the rear of wing 13 is primary central member 27, aligned with the central bore in the nosepiece, and similarly aligned further to the rear is secondary central or tail member 29. Sleevelike connector 28 intervenes, similarly aligned, between the two central members.

As shown flat in FIG. 2, wing 13 has a nearly semicircular outline. Right and left leading edges 33 and 34, which are straight, taper backward at a minor acute angle (on each side) from rectangular indentation 31, which is slightly wider and deeper than nosepiece 21. Defined between the leading edges is angle A, which is not quite a straight angle. Selvages are indicated in broken lines along the right and left leading edges as somewhat wider and shorter than the diameter and length, respectively, of the side members, which are adapted to fit therein and into the bore nosepiece. The medial portion (indicated by broken double line) of the wing extends from indentation 31 to arcuate trailing edge 39 and delineates the location along which the primary central frame member is adapted to lie. Tether-receiving opening 38 in this medial portion of the wing is located nearer to the indentation than to the trailing edge.

FIGS. 3, 4, and 5 show assembled and in plan, side elevation, and rear elevation, respectively, the components shown disassembled in FIG. 2. In these assembled views wing 13 is shown billowing upward at each side between primary central frame member 27 and respective side members 25 and 26, all of which are retained at their forward ends in the bores provided in nosepiece 21. Each side member forms angle B in plan (as in FIG. 3), and dihedral angle D in side elevation (as in FIG. 4), with the central frame member. At its highest extend the billowing wing exceeds the side members in elevation, by angle C (as in FIG. 4). At its medial portion the wing assumes transversely (i.e., viewed in the direction of the central frame members, as in FIG. 5) a cusplike configuration, the flanking portions restrained by the primary central member being mutually tangential to a vertical plane through that member.

As already suggested, angle A is not quite a straight angle; it preferably exceeds the azimuth angle 2B included between the side members viewed in plan to a sufficient extent to provide the desired billow. For example, with a sweep angle such that $B=45°$, then $A=150°$ at a dihedral angle D of 26°. The resulting overelevation angle C of the wing is usually between 5° and 10°, depending upon air speed and weight distribution. Reduction in the dihedral angle D is detrimental to stability, although conducive to increase lift; increase in dihedral alters both lift and stability adversely. The sweep angle B of the wing represents an optimum position with regard to the conflicting objectives of lift and stability. The wing itself has an angular excess (A minus 2B) of about two-thirds compared with what a taut wing would require. The arcuate trailing edge is beneficial to stability.

The above indicated specific angular dimensioning is preferred for use as a kite. In other uses, the change in loading may require compensating changes in the mentioned angles. The center of pressure (exerted by the air on the aircraft) which is variable, depending upon attitude, loading, and wind speed, for example (and is not illustrated) normally will be found to be to the rear of opening 38 through which the tether attaches to frame member 27 for use as a kite, and ahead of the center of gravity, also not illustrated but located about three-fifths of the way from the leading end to the trailing end of the primary central frame member (contacted by the corresponding edges of the wing). It will be apparent that, as the wind velocity varies, the kite will assume a range of attitudes with respect to the point of attachment to the tether, the angle of attack increasing (and the lift and drag decreasing) as the wind velocity increases, so that a substantially constant altitude results. As the minimum wind velocity required to keep this kite aloft is exceedingly low, and the kite is stable also at very high velocities, the kite requires little or no attention in use.

The frame members conveniently are identical to one another in dimensions and composition. They may be made of balsa or other light wood or of aluminum, magnesium, or other light metal, or of suitable plastic, for example. The wing may be made of paper, metal foil, plastic film, or other suitable membranous material. The wing preferably is flexible for all-purpose use, but may be semi-rigid for use under suitably controlled conditions.

In a kite having frame members two feet long, good results are obtained using dowels of balsa three-sixteenths inch in diameter, and a wing made of polyethylene film fifteen-thousandths inch in thickness. The tether may be made of any suitable material, such as nylon hand-fishing line of appropriate tensile strength. It normally will be attached to the primary central frame member about two-fifths of the way from the leading to the trailing edge of the wing, no bridle being required.

In the event of addition of load or increase in the dimensions, the structural requirements on the frame and the wing will increase accordingly, and selection of suitable compositions and dimensions of materials is within the capability of persons having ordinary skill in aeronautic design and construction.

The components of such a kite may be readily assembled by fitting the various frame members and the wing together, as indicated above. When disassembled, the frame members, nosepiece, and connector may be wrapped in the wing, with or without the tether, or all the components may be surrounded by a tubular jacket of any suitable material. Of course, the various components may be provided with fastening means in addition to or in place of the simple sleeve and press fits specified above, and may be fastened together permanently in the assembled position, if desired.

Such a kite may be flown merely for recreation or may be used as a signal or to carry a radio antenna, for example. In larger sizes it may be employed to lift heavier loads, even a man, for observational or other purposes. When equipped with a suitable power plant, an aircraft employing this invention may be launched as a kite and then cut loose for three flight, so powered continuously or intermittently; alternatively it may be launched or flown as a sailplane, unpowered.

Instead of or in addition to an increase in the dimensions of the various components, greater load capacity may be obtained by combining two or more of the basic structural units in a tandem or in-line arrangement, as shown in plan in FIG. 6 and in side elevation in FIG. 7. Except that only one secondary frame member is employed, the illustrated tandem aircraft or kite is simply a repetition of the basic structural unit, with the primary frame member of the second or aft unit extending sufficiently through the nosepiece to engage the first sleeve-like connector, on the end of the primary frame member of the first or forward unit. The secondary frame member of the aft unit is in place connected to the primary frame member of that unit by the second sleeve-like connector.

The specific embodiments of this invention illustrated in the drawings and described above are exemplary, and they may be modified in any way that accords with the present invention, some such modifications being explicit or implicit in the description itself. Also, if desired, the secondary central frame member (and optionally the connector) may be eliminated in favor of an equivalent weighting device fastenable to the trailing end of the primary central frame member to locate the center of gravity as indicated above; however, use of the secondary frame member separate from but connectable to the primary frame member is preferred for simplicity of design. Other substitutions, additions, or variations may be made without involving a departure from the inventive concept.

I claim:

1. Kite comprising a frame and a wing, the frame having a central member extending fore and aft and having a pair of side members extending laterally, rearwardly, and upwardly from the foremost end of the central member, the wing consisting essentially of a substantially semicircular flexible membrane attached along its radial edges to the side members and along its centermost radial portion to the central member from the foremost end thereof and billowing upwardly between the central member and each side member when in flight, the central member extending aft of the trailing edge of the wing for a distance approximating the fore-to-aft extent of the wing.

2. The article of claim 1 wherein the trailing edge of the wing membrane is arcuate when flat.

3. The article of claim 1 wherein the trailing edge of the wing membrane, apart from the frame and flat, is curved through an angle on the order of five-sixths of a straight angle.

4. Kite comprising a main assembly including a fixed nosepiece, an essentially rigid and straight central member extending rearwardly from the nosepiece, a pair of essentially rigid and straight members extending laterally, rearwardly, and upwardly from the nosepiece and in fixed angular relation thereto, and a membranous wing supported fore and aft along its medial portion on the central member, with the leading edge of the wing supported on the side members, the wing being adapted to billow upward on each side of the central member when in flight; and a tail assembly including a tail member similar to the central member and means for attaching the tail member to the aft end of the central member, the tail member when so attached extending aft of the trailing edge of the wing by a distance equal to a major portion of the fore-to-aft extent of the central member.

5. The kite of claim 4 wherein the nosepiece is bored to receive and retain the central and side members, and the wing has means along substantially its entire leading edge to receive and retain the side members; and wherein the nosepiece, central, side, and tail members, and the wing are readily assembled to and disassembled from one another.

6. The kite of claim 4 including four rodlike members of substantially equal length, two or more of them being the side members and the other two comprising the central and tail members.

7. Tandem kite assembly comprising a plurality of the main assemblies of claim 4, with the nosepiece of each succeeding one affixed to the aft end of central member of each preceding one, and with a tail assembly of claim 4 attached to the aft end of the trailing main assembly.

8. Kite apparatus comprising a frame consisting essentially of four straight rodlike members of substantially equal length, one of the members being a central member, two of the members being side members extending laterally, rearwardly, and upwardly from the foremost end of the central member, the remaining member extending rearwardly from the trailing end of the central member, and means for so retaining the respective members in essentially fixed relation to one another; and a wing consisting essentially of a substantially semicircular flexible membrane, attached along its radial edges to the side members and along its centermost radial portion to the central member from the foremost end to substantially the trailing end thereof, whereby the remaining member extends rearwardly for substantially its entire length beyond the trailing edge of the flexible membrane; and tethering means for attachment thereto.

9. The apparatus of claim 8 wherein the tethering means comprises a tether attachable to the frame at a single location only, and the centermost radial portion of the wing has an opening therein to accommodate attachment of the tether to the central member.

References Cited by the Examiner

UNITED STATES PATENTS

| | | | |
|---|---|---|---|
| 294,526 | 3/84 | Stumpp | 244—153 |
| 1,632,822 | 6/27 | Dahl | 244—153 |
| 2,463,135 | 3/49 | Bach | 244—153 |
| 2,537,560 | 1/51 | Wanner | 244—153 |
| 2,546,078 | 3/51 | Rogallo et al. | 244—153 |
| 2,733,880 | 2/56 | Burrell et al. | 244—153 |
| 2,793,829 | 5/57 | Brumfield | 244—153 |
| 2,927,752 | 3/60 | Jordan | 244—153 |
| 3,018,075 | 1/62 | Bowers | 244—153 |
| 3,055,622 | 9/62 | Harmon | 244—153 |

OTHER REFERENCES

Aviation Week, Nov. 2, 1959, page 97.

FERGUS S. MIDDLETON, *Primary Examiner.*